United States Patent Office.

NICHOLAS A. BÜHLE, OF NEW YORK, N. Y.

Letters Patent No. 62,110, dated February 19, 1867.

---

IMPROVEMENT IN GRINDING OR POLISHING IMPLEMENTS.

---

The Schedule referred to in these Letters Patent and making part of the same.

---

TO ALL WHOM IT MAY CONCERN:

Be it known that I, NICHOLAS AUGUSTUS BÜHLE, of No. 105 Nassau street, in the city, county, and State of New York, have invented a new and useful Improvement in Grinding or Polishing Implements; and I do hereby declare that the following is a full, clear, and exact description thereof, which will enable those skilled in the art to make and use the same.

This invention relates to the production by artificial means of stones or implements for sharpening or polishing tools or other articles, and is applicable to the production of wheels, flat stones, or any other kind of sharpening of polishing implement.

In carrying out my invention, I take equal quantities of blood and of linseed or any other suitable oil, and mix them thoroughly together. I then add sufficient Paris white to bring the mixture to a sirup-like condition or consistency. To this compound I add emery, or sand, or rotten-stone, or any other polishing or grinding material of the desired fineness, and in such quantity that the composition will not be too stiff to mould or work, it being desirable that, after all the ingredients are mixed together, the mass shall be in a plastic state. The emery or sand or rotten-stone, or whatever other substance is used instead thereof, must be in a very fine state if it is desired to produce a very fine grinding, sharpening, or polishing surface; but where it is desired to produce a coarse surface, the same is used in a comparatively coarse condition, according to circumstances. When the compound or mixture has been prepared, it is moulded or shaped in moulds or forms of whatever shape the implement is to possess, as, for instance, of the shape of cubes or parallelopipeds, with straight sides or edges, or with curved or oval surfaces, or of the shape of wheels when it is desired to form a polishing or sharpening implement to which rotary motion can be given. In forming said implements, I fill such moulds either wholly with coarse mixture, or wholly with fine mixture when it is desired to produce a grinding, sharpening, or polishing implement whose surface and texture shall be homogeneous throughout. But when I desire to make an implement which shall have a coarse and also a fine surface, I fill the mould or form half full, or less, with the coarser mixture, pressing the same with moderate pressure, and then fill the other half or opposite side of the mould or form with the finer mixture or mixtures, pressing the whole together with considerable pressure to make it compact. This process of making such implements enables me to produce two or more surfaces of varying degrees or qualities of fineness, it being evident that, if the implement has three or more sides, there may be three or more varieties or qualities of grinding or polishing surface. When the implement is to have a circular form, one half or more of its thickness may be made of coarser mixture, and the rest of finer mixture, so that the periphery of the wheel will have both a coarse and fine surface side by side throughout its circumference. After the implements have been moulded or formed they are dried in the open air for about the space of two days, taking care to protect them from rain or moisture, and they are afterwards heated in a muffle to about the temperature of 200° Fahrenheit for about the space of forty-eight hours. After they have been removed from the muffle and allowed to cool off they are ready for use. The proportions above given and the times stated may be varied according to the judgment of the manufacturer, but I obtain good results with those which I have herein given.

Having thus described my invention, what I claim as new, and desire to secure by Letters Patent, is—

1. The composition above described for making grinding or polishing stones, wheels, or other implements, substantially as above set forth.

2. I also claim, in grinding or polishing implements of artificial stone, making their different surfaces, or portions of their surfaces, of different degrees of fineness, substantially as described.

N. A. BÜHLE.

Witnesses:
  W. HAUFF,
  RUDOLPH WÜSTE.